Patented Aug. 31, 1943

2,328,036

UNITED STATES PATENT OFFICE 2,328,036

PROCESS OF PRODUCING SOLUBLE BENZYL ETHERS OF DEXTRAN

Grant L. Stahly and Warner W. Carlson, Columbus, Ohio, assignors, by mesne assignments, to The Commonwealth Engineering Company of Ohio, Dayton, Ohio, a corporation of Ohio No Drawing. Application February 26, 1938, Serial No. 192,887

4 Claims. (Cl. 260—209)

It is the object of this invention to provide a soluble benzyl ether of dextran which has heretofore been insoluble in certain classes of commercial solvents.

It is the object of this invention to provide a process of producing benzyl ether of dextran that is not only soluble but so controlling its production as to control its solubility.

It is a further object to provide a process of dissolving benzyl ether of dextran in order to provide a coating solution for use as lacquer.

It is a further object to react dextran and benzyl chloride in the presence of sodium hydroxide so that the benzyl radical is substituted for the hydrogen atom in one or more of the hydroxyl groups in the dextran molecule to produce a soluble product. The solubility of the product depends upon the number of benzyl radicals in each anhydroglucose unit.

It is an object to provide a process to produce soluble benzyl ether of dextran in which the mole ratio of benzyl chloride to dextran ranges from approximately 2:1 to approximately 7.5:1.

It is a further object to provide a process having two stages in which an insoluble benzyl dextran is first obtained and thereafter there is effected substitution of additional hydroxyl groups to yield a soluble product.

PROCESS OF PREPARATION

In order to secure the lacquer of this invention, an aqueous solution of dextran formed by adding dextran to water and heating and stirring the mixture until the dextran is dissolved is heated with benzyl chloride and sodium hydroxide for suitable periods of time and at suitable temperatures. There results from this process either a benzyl ether of dextran which is insoluble in acetone and other similar solvents or a benzyl ether of dextran which is soluble in acetone.

It has been shown that dextran has one of the following formulas:

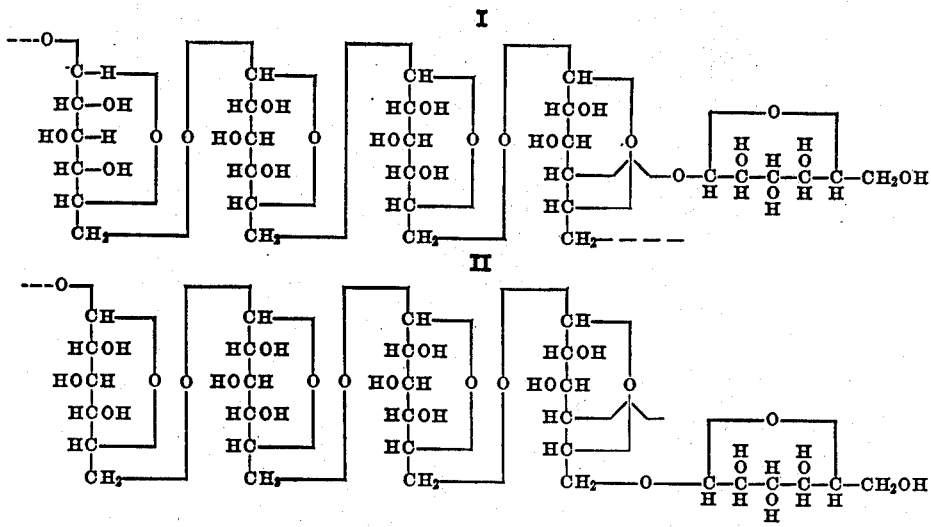

It is apparent that the primary unit of the dextran molecule is a chain of four anhydroglucose residues joined uniformly by glucosidic linkages between the first and sixth carbon atoms of contiguous hexose units. According to Formula I, the fourth hexose unit carries a side chain of one anhydroglucose residue on carbon atom No. 4; according to Formula II, the side chain anhydroglucose unit is attached to the sixth carbon atom and attachment is made to the rest of the molecule through carbon atom No. 4. It is not known how many of these five anhydroglucose units there are in a molecule of dextran but the presence of the side chain separates it definitely in structure from such common polysaccharides as starch and cellulose.

When benzyl chloride is heated with dextran in the presence of sodium hydroxide the benzyl radical is substituted for the hydrogen atom in one or more of the hydroxyl groups in the dextran molecule (see Formulas I and II). The acetone-soluble product contains more benzyl radicals in each anhydroglucose unit than does the acetone-insoluble product. The soluble product is the one described herein.

The following are typical examples of the process. It will be understood that the proportions indicated are relative and approximate in the sense that further experience may indicate modifications of the proportions, depending on the type of production machinery employed and other factors. Modifications of temperature, time and pressure may, likewise, be desirable.

EXAMPLE I

To 30 grams of dextran dissolved in 100 cc. of water were added 46.5 grams of benzyl chloride (mole ratio of 2:1) and 17 grams of sodium hydroxide, and the mixture refluxed at 105 to 110 degrees C. for six hours. Then 46.5 grams of benzyl chloride (total mole ratio of benzyl chloride to dextran, 4:1) and 17 grams of sodium hydroxide were added, and heating continued at 135 to 145 degrees C. for four hours. Soluble benzyl dextran was obtained.

EXAMPLE II

To 30 grams of dextran in 100 cc. of water were added 93 grams of benzyl chloride (mole ratio of 4:1) and 32 grams of sodium hydroxide, and the mixture refluxed with stirring for 0.5 hour at 75 degrees to 80 degrees C. The temperature was then raised to and held at 135 to 140 degrees C. for 0.5 hour. Again it was slowly raised so that at the end of 1.5 hours it stood at 175 to 185 degrees C., where it was held for an additional 1.5 hours. The total heating period was three hours and the yield of soluble benzyl dextran was good.

EXAMPLE III

Thirty grams of dextran, 100 cc. of water, 47 grams of benzyl chloride (mole ratio of 2:1) and 16 grams of sodium hydroxide were refluxed at 75 to 80 degrees C. with stirring for 0.5 hour. Then 23.5 grams of benzyl chloride (total mole ratio of 3:1) and 10 grams of sodium hydroxide were added, and the temperature raised slowly so that at the end of the first hour it stood at 175 to 185 degrees C., where it was maintained for two hours. Soluble benzyl dextran results.

EXAMPLE IV

Thirty grams of dextran, 82 grams of benzyl chloride (mole ratio of 3.5:1), and 30 grams of sodium hydroxide were heated in an iron vessel, with stirring at 25 lbs. per square inch pressure for 0.5 hour. A soluble benzyl ether of dextran is obtained.

EXAMPLE V

| | Grams |
|---|---|
| Dextran | 30 |
| Benzyl chloride | 90 |
| Sodium hydroxide | 40 |

The product resulting from heating together these materials at temperatures from 140 to 180 degrees C. for 3 to 6 hours is steam-distilled. Other dehydrating means or methods may be employed. The resulting product is soluble in such solvents as acetone, cellosolve, dioxane, ethyl acetate, diacetone, mesityl oxide and chloroform.

EXAMPLE VI

It is found that heating under reflux should be conducted from approximately 100 degrees C. to 105 degrees C. for about six hours. This invention is not confined to such temperatures and pressures but this is a satisfactory procedure. It has been found that the addition to the foregoing Example V, after the supernatant liquid has been poured off, of a second batch of 90 grams of benzyl chloride, 40 grams of sodium hydroxide, and 200 cc. of water, and the reheating of the materials under reflux for an additional six hours gives a desirable product. The reaction mixture is steam-distilled to recover benzyl chloride and benzyl alcohol. This is a mole ratio of 7.5:1 moles of benzyl chloride to dextran.

EXAMPLE VII

To 30 grams of dextran dissolved in 100 cc. of water were added 141 grams of benzyl chloride and 45 grams of sodium hydroxide, and the mixture refluxed at 105 to 110 degrees C. for ten hours. The supernatant liquid was poured off, the residue well washed with cold water, and extracted with 400 cc. of acetone. The acetone extract was then poured into cold water to reprecipitate the benzyl dextran, which was then dried in the oven at 90 degrees C. Thirty-six grams of benzyl dextran, representing a yield of 59 per cent of the theoretical amount of 63 grams was obtained. The molecular ratio was 6 moles of benzyl chloride to 1 of dextran.

EXAMPLE VIII

To 30 grams of dextran dissolved in 100 cc. of water were added 117.5 grams of benzyl chloride and 38 grams of sodium hydroxide, and the mixture refluxed for ten hours at 105 degrees to 110 degrees C. With the same purification procedure as was described before, 28 grams of benzyl dextran were obtained, a yield of 44 per cent of the theoretical. The molecular ratio of benzyl chloride to dextran in this case was 5:1.

EXAMPLE IX

To 30 grams of dextran dissolved in 100 cc. of water were added 93 grams of benzyl chloride and 32 grams of sodium hydroxide, and the mixture refluxed at 105 degrees to 110 degrees C. for ten hours. After the usual purification, a yield of 12 grams (19 per cent) of acetone-soluble, and 23 grams (37 per cent) of acetone-insoluble benzyl dextran were obtained. The molecular ratio of benzyl chloride to dextran was 4:1.

EXAMPLE X

To 30 grams of dextran dissolved in 100 cc. of water were added 23.5 grams of benzyl chloride (mole ratio of 1:1) and 10 grams of sodium hydroxide, and the mixture heated at 105 to 110 degrees C. for six hours. At the end of this time, 70 grams of benzyl chloride (bringing the final mole ratio to 4:1) and 25 grams of sodium hydroxide were added and heating continued at 135 to 140 degrees C. for 4 hours more. Thirty-one grams (49 per cent yield) of acetone-soluble benzyl dextran were obtained.

EXAMPLE XI

To 30 grams of dextran dissolved in 100 cc. of water were added 70 grams of benzyl chloride (mole ratio of 3:1) and 25 grams of sodium hydroxide, and the mixture heated as before at 105 to 110 degrees C. for 6 hours. With the addition of 23 grams of benzyl chloride (bringing the total mole ratio to 4:1) and 10 grams of sodium hydroxide, the mixture was heated for an additional 4 hours at 135 to 140 degrees C. The yield of acetone-soluble benzyl dextran was 48 grams, or 76 per cent of the theoretical.

Example XII

To 30 grams of dextran dissolved in 100 cc. of water were added 58.75 grams of benzyl chloride (mole ratio of 2.5:1) and 20 grams of sodium hydroxide, and the mixture heated with stirring for 3.5 hours at 75 to 80 degrees C. At the end of this time, 35.3 grams of benzyl chloride (bringing the total mole ratio to 4:1) and 12 grams of sodium hydroxide were added, and heating continued at 135 to 145 degrees C. for 0.5 hour, and then at 175 to 185 degrees C. for 2 hours. The total period of heating was 6 hours.

Example XIII

To 30 grams of dextran in 100 cc. of water were added 93 grams of benzyl chloride (mole ratio of 4:1) and 32 grams of sodium hydroxide, and the mixture heated at 105 to 110 degrees C. for 0.5 hour. During the next half-hour the temperature was slowly raised so that at the end of the first hour of heating it stood at 135 to 140 degrees C., where it was held at 175 to 185 degrees C., giving a total heating period of 4 hours.

Example XIV

To 375 cc. of a culture medium containing 30 grams of dextran were added 47 grams of benzyl chloride (mole ratio of 2:1) and 16 grams of sodium hydroxide, and the solution heated at 75 to 80 degrees C. for 0.5 hour with stirring. The temperature was then raised and held at 105 to 110 degrees C. for one hour. Forty-seven grams of benzyl chloride (making the total mole ratio 4:1) and 16 grams of sodium hydroxide were added, the mixture heated at 120 degrees to 125 degrees C. for 1 hour, and at 155 to 160 degrees C. for three hours.

The purification of the benzyl ether of dextran involves in general (1) steam distillation for the removal of benzyl alcohol and excess benzyl chloride, (2) maceration of the benzyl ether of dextran in water to remove water-soluble impurities and (3) complete removal of the water from the resulting product. Detailed methods of purification may vary widely according to convenience. The purpose of purification is also to recover the benzyl alcohol and excess benzyl chloride in the steam distillate.

Solvents

The following is a table giving the solvent characteristics of this product:

| Solvent: | |
|---|---|
| Water | Insoluble |
| 2N HCL | Do. |
| 2N NaOH | Do. |
| Methyl alcohol | Do. |
| Ethyl alcohol | Do. |
| Isoamyl alcohol | Do. |
| Glycerol | Do. |
| Glycol | Do. |
| Cellosolve | Soluble |
| Dioxane | Do. |
| Ethyl acetate | Do. |
| Butyl acetate | Do. |
| Acetone | Do. |
| Diacetone | Do. |
| Mesityl oxide | Do. |
| Chloroform | Do. |
| Benzene | Softens |
| Toluene | Do. |

Two points of particular interest are to be noted in the table: (1) the insolubility of the benzyl dextran in water, alkalis, acids and the common alcohols, and (2) its solubility in the cheap commercial solvents, acetone, ethyl acetate and butyl acetate. By properly regulating the proportions of these solvents in the finished lacquer it is possible to obtain a wide variation in the rate of drying. It is comprehended within the term "solvent" or the use of the terms "acetone," "butyl acetate" or "ethyl acetate," such other equivalent solvents as may from time to time be available in this connection. Under some circumstances it is found desirable to mix with such solvents others to bring the evaporation rate to such controlled rate as may be desired, as the rate of evaporation with acetone or ethyl acetate is very high.

The proportions of solvent and benzyl ether of dextran depend upon the type of coating to be employed. It has been found that 20 per cent solids and the balance solvents is a satisfactory proportion for some types of coatings.

The dextran itself is necessarily produced bacteriologically, and the benzyl ether of dextran is therefore produced by the combined bacteriological and chemical action, as set forth in the co-pending application of Grant L. Stahly and Warner W. Carlson, Serial Nos. 156,426 and 156,427, both filed July 29, 1937. In the event of following such methods so disclosed, then such methods are modified in accordance with this present invention.

The process and the reaction follow generally two stages: first, the production of an insoluble benzyl dextran, and secondly, the substitution of an additional hydroxyl group to yield a soluble product.

The products recited herein are claimed in our co-pending application Ser. No. 192,886, filed Feb. 26, 1938.

It will be understood that it is desired to comprehend within this invention such modifications as come within the scope of the claims and the invention.

Having thus fully described our invention, what we claim as new and desire to secure by Letters Patent, is:

1. In a process of manufacturing a soluble benzyl ether of dextran, mixing 30 grams of dextran in 100 cc. of water, adding 46.5 grams of benzyl chloride (mole ratio of 2:1) and 17 grams of sodium hydroxide, and refluxing the mixture at 105 to 110 degrees C. for 6 hours; thereafter adding 46.5 grams of benzyl chloride (total mole ratio of benzyl chloride to dextran 4:1) and 17 grams of sodium hydroxide, and heating for 4 hours at 135 to 145 degrees C.

2. A method of manufacturing an acetone soluble benzyl ether of dextran in two stages consisting of (a) forming an acetone insoluble benzyl dextran by reacting an aqueous solution of dextran, benzyl chloride and sodium hydroxide at a temperature range of between 80 and 110 degrees C. for several hours until an acetone insoluble benzyl dextran is formed; (b) thereafter adding more benzyl chloride and sodium hydroxide to the first mentioned heat treated mixture and continuing the reaction at a higher temperature range between 135 to 185 degrees C. for several hours to form an acetone soluble benzyl dextran.

3. In a process of producing benzyl ether of dextran which is soluble in a solvent selected from the class consisting of acetone, cellosolve, dioxane, diacetone, mesityl oxide, chloroform, butyl acetate and ethyl acetate, the steps of (a) reacting under heat a water solution of dextran with benzyl chloride in a mole ratio of 2 : 1 to 4 : 1 together with at least 17 grams of sodium hydroxide and heating the mixture from 3 to 6 hours, and (b) reacting the mixture a second time with additional benzyl chloride and sodium hydroxide with heat to a maximum of approximately 6 hours, and wherein the mole ratio of benzyl chloride to dextran is increased from 3 : 1 to 7.5 : 1 to produce a dextran ether reaction product soluble in the aforementioned solvent.

4. In a process of producing benzyl ether of dextran which is soluble in solvent selected from the class consisting of cellosolve, dioxane, ethyl acetate, butyl acetate, acetone, diacetone, mesityl oxide and chloroform, the steps of (a) reacting at a temperature of substantially 105 to 110° C. a water solution of dextran with benzyl chloride in a mole ratio of 2 : 1 in admixture with sodium hydroxide for a period of six hours; and (b) thereafter adding benzyl chloride in quantity sufficient to give a total mole ratio of 4 : 1 and a further quantity of sodium hydroxide substantially equal to that originally added and heating for a further period of four hours at a temperature of substantially 135 to 145° C. whereby there is produced a dextran ether reaction product soluble in solvents of the aforementioned class.

GRANT L. STAHLY.
WARNER W. CARLSON.